United States Patent [19]

Diosady et al.

[11] Patent Number: 4,889,921

[45] Date of Patent: Dec. 26, 1989

[54] PRODUCTION OF RAPESEED PROTEIN MATERIALS

[75] Inventors: Levente L. Diosady, Willowdale; Leon J. Rubin; Yew-Min Tzeng, both of Toronto, all of Canada

[73] Assignee: The University of Toronto Innovations Foundation, Toronto, Canada

[21] Appl. No.: 43,880

[22] Filed: Apr. 29, 1987

[51] Int. Cl.$^4$ ............................................. A23J 1/14
[52] U.S. Cl. .................................. 530/377; 426/656; 530/378
[58] Field of Search .............................. 530/377, 378

[56] References Cited

U.S. PATENT DOCUMENTS

| | | | |
|---|---|---|---|
| 3,622,556 | 11/1971 | O'Connor | 530/377 |
| 3,736,147 | 5/1973 | Iacobucci et al. | 530/377 |
| 3,758,452 | 9/1973 | Owen | 530/377 |
| 3,993,636 | 11/1976 | Maubois et al. | 530/377 |
| 3,995,071 | 11/1976 | Goodnight, Jr. et al. | 530/378 X |
| 4,088,795 | 5/1978 | Goodnight, Jr. et al. | 530/377 |
| 4,325,868 | 4/1982 | Brown et al. | 530/378 X |
| 4,332,719 | 6/1982 | Lawhon et al. | 530/377 |
| 4,420,425 | 12/1983 | Lawhon | 530/378 |
| 4,460,504 | 7/1984 | Rubin et al. | 530/377 |
| 4,677,065 | 6/1987 | Buchbjerg et al. | 530/378 X |

OTHER PUBLICATIONS

Journal of Food Science, 49(1984), 768–776, Diosday et al.

Primary Examiner—Howard E. Schain
Attorney, Agent, or Firm—Wyatt, Gerber, Burke and Badie

[57] ABSTRACT

A process of treating meal containing vegetable proteins is disclosed. This process includes the step of extracting the metal with a suitable aqueous solvent in which the vegetable proteins are soluble to obtain an extraction solution. The solubility of the dissolved protein in the extraction solution is then adjusted to precipitate at least some of the protein and therefore obtain a precipitated protein fraction and an unprecipitated protein fraction in solution. The precipitated protein fraction is then separated from the protein fraction in solution, and the unprecipitated protein fraction is separated from the undesirable components in the solution by membrane processing. Each of the protein fractions is then suitably dried to recover the proteins.

25 Claims, 1 Drawing Sheet

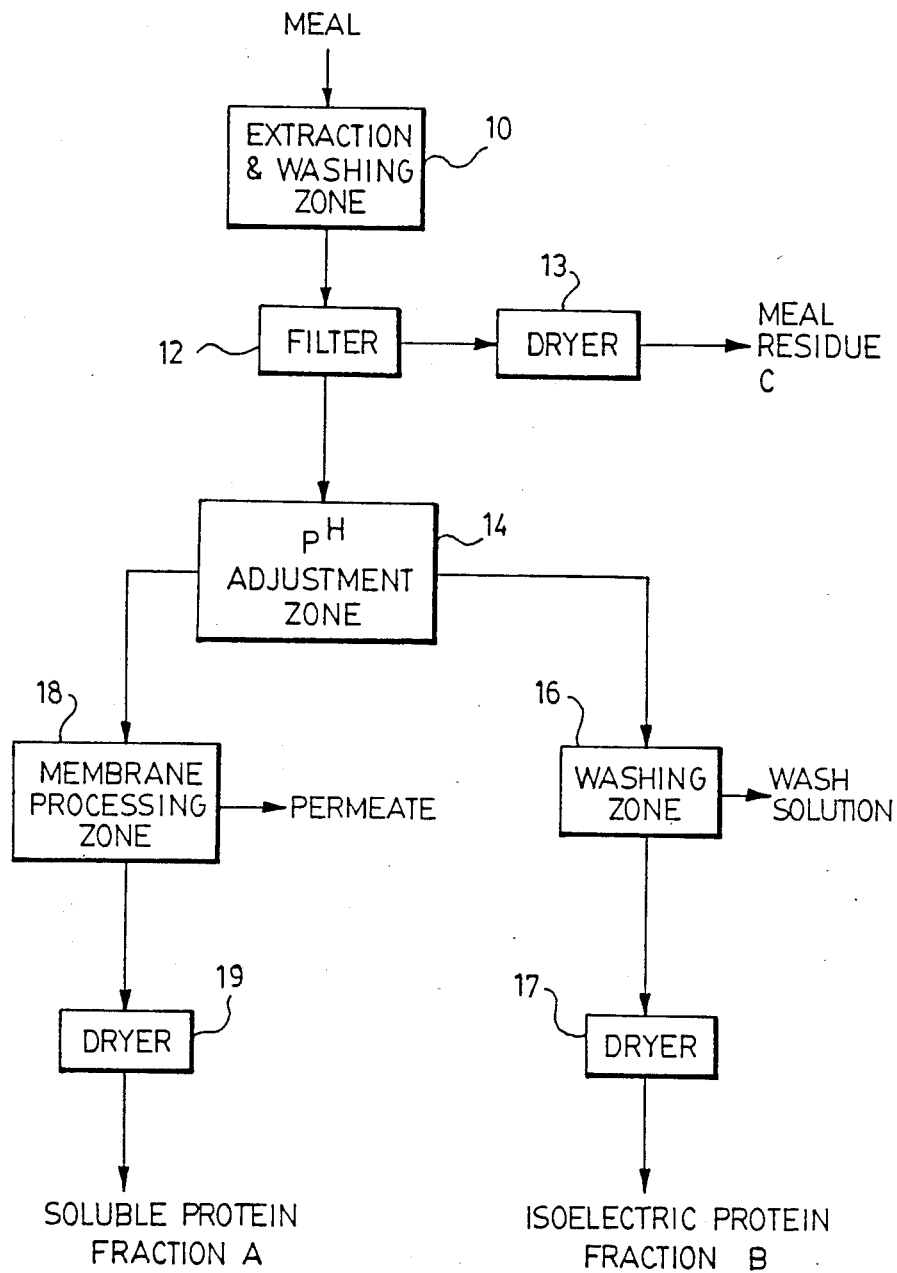

PRODUCTION OF RAPESEED PROTEIN MATERIALS

FIELD OF THE INVENTION

This invention relates to the treatment of meal and other materials containing vegetable protein. More particularly, it relates to methods of extracting vegetable proteins from these materials.

BACKGROUND OF THE INVENTION

Brassica seeds, especially rapeseed, after oil extraction are a potential source of high-quality protein. After oil extraction, rapeseed meal contains about 38% protein compared to approximately 44% in soybean meal, the latter being widely used for feed and food purposes. Proteins contained in rapeseed are rich in lysine and contain adequate quantities of methionine, both of which are limiting amino acids in most cereal and oilseed proteins. However, the use of rapeseed as a protein source in food products has been severely limited as the proteinaceous material which is left over after oil extraction by known methods contains unwanted constituents such as glucosinolates, phenolics, phytates, and hull, which should be removed from the protein meal of these seeds or at least reduced in quantity therein, in order for the meal and the proteins derived therefrom to be acceptable for human consumption.

The reduction or removal of glucosinolates is particularly important, since they are broken down by enzymes present in the seed and in the human body, producing various degradation products that interfere with thyroid function in the body. Thus for human food use, the glucosinolate content of, for example, proteins derived from rapeseed meal should be substantially eliminated to ensure complete product safety. Phenolic compounds impart a bitter favour and dark colour to the final protein products. Phytates are strong chelating agents and affect the utilization of polyvalent metal ions, especially zinc and iron, by strongly binding these metals and making them unavailable for metabolism. The hull is present in large amounts and is indigestible for humans and other monogastric animals. It also gives an unsightly heterogeneous product.

These unwanted constituents are difficult to separate from proteins in the rapeseed meal. Unlike other protein-rich oilseeds such as soybean, peanuts and sunflowerseed, rapeseed has a complex protein composition and contains proteins with widely different isoelectric points and molecular weights. Accordingly, the production of isoelectrically precipitated rapeseed-protein isolates with 90% protein content requires complex processes which result in low yields. Also, the products generally contain high concentrations of phytates, present as protein-phytate complexes. Thus, traditional protein-isolation processes are economically and technically unattractive for the production of high-quality rapeseed proteins.

At present, there seem to be no rapeseed-protein isolates in commercial production. In a recent review article prepared for the Canola Council of Canada, Youngs (see "Technical Status Assessment of Food Proteins from Canola", Canola Council of Canada, October 1985) concluded that, in spite of extensive research, the presence of glucosinolates, phytates, phenolics, and hull still represents a serious problem.

In general, protein isolates from rapeseed material have been extracted experimentally, using multi-solvent co-current or counter-current operations. The extracted proteins are recovered in these operations by precipitation at one or more isoelectric points, sometimes enhanced by heat coagulation or complex formation followed by washing and drying. These experimental processes are too complicated and expensive to be used as viable commercial processes.

Membrane processing by ultrafiltration and/or diafiltration has become a popular laboratory technology for vegetable protein isolation in recent years. Ultrafiltration is a technique for separating dissolved molecules on the basis of their size, shape and flexibility by passing their solution through a membrane which acts as a filter with pore diameters suitable for retaining large molecules. Diafiltration is a special technique of ultrafiltration for the removal of small-molecular-weight compounds from an aqueous solution also containing large molecules.

U.S. Pat. No.4,420,425, which issued to Lawhon on Dec. 13, 1983, explored the potential applications of solubilization and ultrafiltration in soybean and peanut protein systems. Protein extraction of rapeseed was not considered.

In attempting to break the protein-phytate complex to remove the phytate associated with the processing of soybean, peanut, cottonseed and the like, U.S. Pat. No. 3,736,147 dated May 29, 1973, which issued to Iacobucci et al proposed to use diafiltration with 0.2 molar calcium chloride solution at a pH of 3, or phytase in the pH range of 4.5 –7. The process of this patent is directed towards preparing protein products from soybean, cottonseed, peanut, and sesame seed. Protein extraction of rapeseed is not considered.

A rapeseed-protein isolate has been reported by Von Bockelmann et al in "Potential Applications in Food Processing", in the chapter "Reverse Osmosis and Synthetic Membranes", Ed. S. Sourirajan, page 445, National Research Council of Canada, Publication No. NRCC15627, 1977. This isolate contained 30% protein. The isolate produced by Diosady et al (J. Food Sci. 44:768, 1984) contained 80% protein, but was high in phytate.

A rapeseed protein product with a 76% protein content was obtained by Maubois et al using ultrafiltration in U.S. Pat. No. 3,993,636 which issued Nov. 23, 1976. However, a protein content of 76% is too low to be considered an isolate, and since the extraction of the meal was carried out at pH 9, where rapeseed protein solubility is not very high, the protein yield was likely low, although unreported.

Although aqueous sodium hydroxide solutions are effective solvents for rapeseed protein extraction and give high extraction yields, the isoelectric precipitation of these extracts results in low yields, low protein content in the isolates, or both. Likewise, current applications of ultrafiltration and/or diafiltration to rapeseed protein extraction do not result in high-quality rapeseed protein isolates. Thus the problem of developing a commercially viable process for producing pure, food-grade protein from rapeseed up to the present remains unsolved.

SUMMARY OF THE INVENTION

The present invention provides a process of treating meal containing vegetable protein which comprises:
 extracting the meal with a suitable aqueous solvent in which the vegetable proteins are soluble to obtain an extraction solution, adjusting the solubility of the dissolved proteins in this extraction solution to precipitate at least some of the proteins and obtain a precipitated protein fraction and an unprecipitated protein fraction in solution, separating the precipitated protein fraction from the unprecipitated protein fraction, and separating the unprecipitated protein fraction from the undesirable components in the solution by membrane processing.

Preferably, the solvent used in extracting the meal is an alkaline solution. Preferably, the solubility of the dissolved protein in the extraction solution is adjusted by adjusting the pH of the solution. It is also preferred that the membrane processing is by ultrafiltration and/or diafiltration.

Unwanted constituents are extracted and separated from the pure protein fractions in the meal of oil-bearing seeds by adjusting the solubility of the meal solution to separate the insoluble phytates, hull, and meal residue from the extraction solution containing soluble proteins. The solubility of the dissolved protein in the extraction solution is then adjusted so as to separate the insoluble protein fraction and leave the soluble protein fraction in solution. Membrane processing techniques are subsequently used to remove additional unwanted, low-molecular-weight constituents from the soluble protein fraction, and to concentrate and isolate this protein fraction.

By means of the process of the present invention, there can be obtained from the meal of various oil-bearing seeds, high-quality protein fractions that are low in unwanted constituents such as phytates, glucosinolates, phenolics, and hull and are aesthetically and nutritionally appealing. Typically, 90% or more of the recoverable protein originally present in the seeds may be recovered. Each of the protein isolates resulting from the process of the present invention has its own specific functional properties. Thus they may serve as versatile ingredients in food formulations. Moreover, a residual meal with a moderate protein concentration of between 30–40% and substantially free of glucosinolates may be produced which is a good feed-grade material.

BRIEF REFERENCE TO THE DRAWINGS

The invention will now be described by way of illustration only, with respect to the following drawing which is a diagrammatic process flow sheet of a specific preferred process according to the invention.

DESCRIPTION OF THE PREFERRED EMBODIMENTS

Referring to the drawing, the starting meal, substantially free from oil, is extracted at an extraction and washing zone 10 with an aqueous alkaline solution e.g. aqueous sodium hydroxide, to dissolve the protein component into the extraction solution and leave most of the hull and phytate undissolved in a wet residue. This wet residue is suitably separated e.g. by filter 12 from the extraction solution, and dried in dryer 13 to provide a meal residue C. The pH of the resultant extraction solution is subsequently adjusted in zone 14 with an acid solution to alter the solubility of its component proteins and produce a protein-precipitate fraction and a protein-solution fraction. The two protein fractions are suitably separated. The protein-precipitate fraction is washed in a washing zone 16 with acidic water and dried in dryer 17 to provide an isoelectric-protein fraction B. The protein-solution fraction is subjected at membrane processing zone 18 to ultrafiltration followed by diafiltration and is then dried in dryer 19 to provide a soluble protein fraction A.

In a preferred form, the pH of the extraction solution is between 10 and 12.5 at which the proteins are dissolved and most of the phytates and hull undissolved. Variations in this pH value will effect the yields of the protein isolates and the solubility of the phytates. Suitably, the extraction solution is an aqueous solution of an alkaline compound such as sodium hydroxide, potassium hydroxide, or calcium hydroxide.

It is desired that the solvent-to-meal ratio for the extraction be between 8 and 50, most preferably 18, followed by washing with solvent to meal ration of 5 to 20.

Due to the low solubility of the phytates and fibre in the preferred pH range, they may be readily separated by conventional techniques from the extraction solution in the form of a wet residual meal, which may be suitable, when dried, for use as an animal feed.

The solubility of the dissolved proteins in the resultant extraction solution is adjusted to precipitate one fraction of the protein, the insoluble or isoelectrically precipitated protein fraction, from the other fraction, the soluble protein fraction in solution. Suitably, the solubility is adjusted by adjusting the pH by adding any aqueous acid solution such as hydrochloric, sulphuric, phosphoric or acetic acid, which separates the insoluble and soluble protein fractions. Preferably, the addition of the aqueous acid solution lowers the pH to between 2–8, most preferably 3.5 for rapeseed or canola.

To further reduce the phytate level in the soluble protein fraction, up to 50% by weight of the starting meal of calcium chloride may optionally be added.

The two protein fractions, the insoluble protein fraction as a precipitate and the soluble protein fraction in solution, may be appropriately separated from one another by conventional separation techniques.

The precipitated insoluble protein fraction is subsequently washed with a suitable solution to purify it further. It is preferred that the washing solution be acidified water at the same pH as that of the previous solution from which the protein was separated, and that the solvent-to-precipitate ratio be between 5–20, most preferably 10. The protein precipitate may be repeatedly washed with such a solution if the concentration of the impurities is high, as long as the protein loss is not too great. The result, after a suitable drying, is a high-quality, isoelectrically precipitated protein.

The soluble protein fraction in solution is concentrated and separated from of the low-molecular-weight, potentially toxic impurities such as glucosinolates and the hydrolysis products thereof by a membrane process. Most preferably, this membrane process comprises an ultrafiltration step to concentrate the protein fraction, followed by a diafiltration step to further purify the soluble protein. The permeate, after the diafiltration step, in which there is minimal protein loss, is discarded. The resulting retentate is dried to produce a high-quality soluble protein. Filtration membranes of 5–50 kilodaltons molecular weight cut-off provide good protein recovery and impurity removal. For rapeseed protein processing, a 10 kilodalton membrane is preferred.

Based on the concentration of the protein solution to undergo membrane processing and the purity of the product required, the concentration factor (CF) of ultrafiltration operation may be varied from 5–20, and the diavolume (DV) of diafiltration may be varied from 3-15. Most preferably, a CF of 10 and DV of 5 were used to optimally reduce the concentration of permeable impurities by up to three orders of magnitude.

The steps prior to membrane processing had separated, by way of solubility differences, the dissolved protein into two fractions, so that the concentration of protein remaining in solution was relatively low. Thus, the subsequent processing techniques proceeded more efficiently with the elimination of the usual gelation and plugging problems associated with membrane processing in protein production systems.

Optionally, antioxidants such as sodium sulphite may be added during extraction to improve the colour of the final products.

Any type of oil-free meal containing protein can suitably be processed by the process of the present invention. Most suitably processed are oilseeds derived from Brassica seeds especially rapeseed and canola, which are essentially free from oil components, and ground if necessary, before alkaline extraction and washing to allow the subsequent separation of the soluble protein fraction from the insoluble phytate and hull.

An oil-extraction method developed by the inventors for the treatment of rapeseed simultaneously with methanol-ammonia and hexane is suitable for processing the oilseeds prior to their treatment by the process of the present invention. This method is described in U.S. Pat. No. 4,469,504 which issued on July 17, 1984 to Rubin et al, Can. Inst. Food Sci. Technol. J. 19. 57, 1986, and Diosady et al, Can. Inst. Food Sci. Technol. J. 18, 121, 1985, the contents of all of which are incorporated herein by reference.

Whilst the process of the invention shows great advantages when applied to commercially prepared meals such as canola and rapeseed meals, and other Brassica meals and flours, it is, as described hereinabove especially suitable to meals from novel oil extraction techniques such as hexane-extracted and air-dried canola meal, methanol/ammonia/hexane-extracted canola meal, dehulled hexane-extracted and air-dried canola meal and dehulled methanol/ammonia/hexane-extracted canola meal. Rapeseed meal is the most preferred starting material. The invention may also be suitable for isolating vegetable proteins from soy, sunflower, peanuts, and cotton seed.

EXAMPLE 1

One hundred grams of methanol/ammonia/hexane-defatted canola meal prepared according to the process of Rubin et al, U.S. Pat. No. 4,460,504; 1984 and Rubin et al., "The Aklanol-Ammonia-Water/Hexane Treatment of Canola", Can. Inst. Food Sci. Technol. J. 19: 57, 1986) was stirred for 2 hours with 1800 g water. The pH was kept constant at 12.0 by adding 50% (w/w) NaOH. The slurry was separated by centrifugation (4,080 g, 10 min., 5° C.), and the filtrate polished by vacuum filtration using Whatman No. 41 paper. Three batches of the extraction solution were prepared. Two thousand four hundred grams of the extraction solution was acidified to pH 3.5 by adding 6N HCl solution within 4 hours from the time that the meal was first immersed in the alkaline solution. In two of the batches, 5.26 g and 39.26 g of $CaCl_2$ were added prior to pH adjustment resulting in final $CaCl_2$ concentrations of 0.02 M and 0.15 M, respectively. After separating the protein precipitate by centrifugation, the solution was filtered. Fifty grams of the wet precipitate was washed with 500 g of pH 3.5 water, and then the washed protein was freeze-dried. In the meantime, 1600 g of the protein solution was concentrated to 160 g by ultrafiltration. One hundred grams of the retentate was diafiltrated with 500 g water. After 500 g of the permeate was collected, the diafiltration retentate was recovered and freeze-dried to produce a water-soluble protein isolate.

The dry-matter content (total solids) of each processing stream was determined. The wet samples were dried at 105° C. in a forced-air oven for 24 hours. All freeze-dried samples were oven dried at 105° C. overnight prior to analysis. Crude protein (N×6.25) was determined by the Kjeldahl method. Glucosinolate content was determined by the method of Wetter and Youngs ("A thiourea-UV assay for total glucosinolate content in rapeseed meals", JAOCS, 53:162, 1976). The content of glucosinolate in the meal is expressed as $\mu M$ equivalent of 3-butenyl-isothiocyanate per gram of sample. Phytate was determined by a procedure adapted from the methods given by Wheeler and Ferrel ("Phytic acid: I. Determination of three forms of phosphorus in flour, dough, and bread", Cereal Chem. 58:226, 1981), as previously described (Naczk et al., "The phytate and complex phenol content of meals produed by alkanol-ammonia/hexane extraction of canola", Lebensm.-Wiss. U.-Technol. 19:3, 1986).

The results, compositions and yields, are given in Table 1.

Most of the nitrogen ($\geq 90\%$) in the starting meal was recovered as three usable products by the process. Approximately 45% of the nitrogen was recovered as protein isolates.

As the concentration of $CaCl_2$ is increased, the yield ratio of the isoelectric protein to the soluble protein is decreased, due to the "salting in" effect. All protein isolates had protein contents of $\geq 90\%$. To obtain a phytate-free protein isolate, substantial amounts of $CaCl_2$ must be used. The residual meal had protein content of 33.1% and was free of glucosinolates, which makes it a usable feed material.

EXAMPLE 2

The procedure of Example 1 was essentially repeated, using, a hexane-extracted and air-dried canola meal as the starting meal in place of the methanol/ammonia/hexane meal. The meal was extracted at pH 11.0 for 30 min. Only one batch of extraction solution was prepared. $CaCl_2$ was not used. The pH of the extraction solution was brought down to 3.5 within 2 hours from the moment when the meal was first immersed in the alkaline solution. Total solids, crude protein, glucosinolate, and phytate determinations were carried out as in Example 1. The results are given in Table 2.

The results indicate that 75.4% of the nitrogen in the starting meal was recovered in the isolates. Because approximately 10% nitrogen is bound in the hulls and another 10% is non-protein nitrogen, the recovery of the usable protein was as high as 94.25% (75.4/80×100%). Both isolates were free of glucosinolates and low in phytate.

EXAMPLE 3

The procedure of Example 2 was essentially repeated, except that a dehulled hexane-extracted and air-dried canola meal prepared according to the process of Schneider, Canadian Patent No. 1,062,118; 1979, was used as the starting meal in place of the "whole" meal. The results are given in Table 3.

Only 50% of the nitrogen was recovered as isolates, due to the low solubility observed during extraction. This may be due to the treatment in the dehulling process. However, the residual meal (dehulled) is a high-quality feed material.

EXAMPLE 4

The procedure of Example 1 was repeated, with the following changes: a dehulled methanol/ammonia/hexane-extracted canola meal was used as the starting meal; a single extraction batch was used for membrane processes, and no $CaCl_2$ was added.

The results are given in Table 4.

The protein solubility was low, due to the treatment in the dehulling process (Schneider, Canadian Patent No. 1,062,118, 1979) and the effect of methanol/ammonia solution. Approximately 42% nitrogen was recovered in a dehulled residual meal with a protein content of 38.5%, which is a usable feed material.

EXAMPLE 5

The procedure of Example 2 was essentially repeated, except that a commercial canola meal was used as the starting meal, and the extraction was carried out in the presence of 0.0024 $Na_2SO_3$ as an anti-oxidant, equivalent to 1% (w/w) of the meal.

The results are given in Table 5.

Approximately - 62%, of the nitrogen was recovered as a meal. Because of low protein solubility which was due to the heat treatment of the proteins during commercial processing, the Yield and protein concentration of the isolates were both low. The colour of the isolates was light due to the effect of sodium sulphite.

TABLE 1

Effect of precipitation and ultrafiltration/diafiltration process on methanol/ammonia/hexane-extracted canola meal (NaOH extraction at pH 12, 10 kD membrane for UF/DF).

Compositions And Yields

| | Protein | Glucosinolates | Phytic | Yield (as % of starting meal) | | | |
|---|---|---|---|---|---|---|---|
| | N × 6.25 | μM/g | acid % | Solids | N | Glucosinolates | Phytic acid |
| Starting meal | 50.5 | 0.6 | 4.32 | 100 | 100 | 100 | 100 |
| Meal residue | 33.1 | N/D* | 5.63 | 69.1 | 45.2 | ≈0 | 90 |
| 1. without $CaCl_2$ addition | | | | | | | |
| Isoelectric protein | 98.7 | N/D | 1.56 | 13.2 | 25.8 | ≈0 | 4.8 |
| Soluble protein | 94.2 | N/D | 1.41 | 11.3 | 21.0 | ≈0 | 3.7 |
| LOSS | | | | 6.4 | 8.0 | ≈100 | 1.5 |
| 2. $CaCl_2$ equivalent to 6.7% of meal solids was added | | | | | | | |
| Isoelectric protein | 100.6 | N/D | 1.54 | 12.0 | 23.9 | ≈0 | 4.3 |
| Soluble protein | 103.1 | N/D | 1.13 | 10.7 | 21.9 | ≈0 | 2.8 |
| LOSS | | | | 8.2 | 9.0 | ≈100 | 2.9 |
| 3. $CaCl_2$ equivalent to 50% of meal solids was added | | | | | | | |
| Isoelectric protein | 91.1 | N/D | 0.73 | 5.5 | 9.9 | ≈0 | 0.9 |
| Soluble protein | 90.8 | N/D | 0 | 19.9 | 35.8 | ≈0 | 0 |
| Loss | | | | 5.5 | 9.1 | ≈100 | 9.1 |

*Not detected

TABLE 2

Effect of precipitation and ultrafiltration/diafiltration process on hexane-extracted canola meal (NaOH extraction at pH 11, 10 kD membrane for UF/DF).

Compositions And Yields

| | Protein | Glucosinolates | Phytic | Yield (as % of starting meal) | | | |
|---|---|---|---|---|---|---|---|
| | N × 6.25 | μM/g | acid % | Solids | N | Glucosinolates | Phytic acid |
| Starting meal | 39.2 | 15.3 | 3.92 | 100 | 100 | 100 | 100 |
| Meal residue | 11.4 | N/D | 6.51 | 49.9 | 14.6 | ≈0 | 82.9 |
| Isoelectric protein | 87.4 | N/D | 1.09 | 19.2 | 42.8 | ≈0 | 9.5 |
| Soluble protein | 96.1 | N/D | 1.24 | 13.3 | 32.6 | ≈0 | 4.1 |
| LOSS | | | | 17.6 | 10.0 | ≈100 | 3.5 | covered as high-quality protein isolates. More than 50%

TABLE 3

Effect of precipitation and ultrafiltration/diafiltration process on hexane-extracted dehulled canola meal (NaOH extraction at pH 11, 10 kD membrane for UF/DF).

Compositions And Yields

| | Protein | Glucosinolates | Phytic | Yield (as % of starting meal) | | | |
|---|---|---|---|---|---|---|---|
| | N × 6.25 | μM/g | acid % | Solids | N | Glucosinolates | Phytic acid |
| Starting meal | 52.1 | 20.4 | 4.44 | 100 | 100 | 100 | 100 |
| Meal residue | 39.5 | N/D | 7.64 | 52.1 | 39.5 | ≈0 | 89.6 |
| Isoelectric protein | 97.3 | N/D | 2.39 | 7.5 | 14.0 | ≈0 | 4.0 |
| Soluble protein | 102.5 | N/D | 1.14 | 18.0 | 35.4 | ≈0 | 4.6 |

TABLE 3-continued

Effect of precipitation and ultrafiltration/diafiltration process on hexane-extracted dehulled canola meal (NaOH extraction at pH 11, 10 kD membrane for UF/DF).
Compositions And Yields

| | Protein | Glucosinolates | Phytic | Yield (as % of starting meal) | | | |
|---|---|---|---|---|---|---|---|
| | N × 6.25 | μM/g | acid % | Solids | N | Glucosinolates | Phytic acid |
| LOSS | | | | 22.4 | 11.1 | ≈100 | 1.8 |

TABLE 4

Effect of precipitation and ultrafiltration/diafiltration process on methanol/ammonia/hexane-extracted dehulled canola meal (NaOH extraction at pH 12, 10 kD membrane for UF/DF).
Compositions And Yields

| | Protein | Glucosinolates | Phytic | Yield (as % of starting meal) | | | |
|---|---|---|---|---|---|---|---|
| | N × 6.25 | μM/g | acid % | Solids | N | Glucosinolates | Phytic acid |
| Starting meal | 50.7 | 3.1 | 4.68 | 100 | 100 | 100 | 100 |
| Meal residue | 38.5 | N/D | 6.02 | 69.3 | 52.6 | ≈0 | 89.2 |
| Isoelectric protein | 97.8 | N/D | 2.47 | 10.1 | 19.5 | ≈0 | 5.3 |
| Soluble protein | 103.6 | N/D | 1.33 | 11.1 | 22.7 | ≈0 | 3.2 |
| LOSS | | | | 9.5 | 5.2 | ≈100 | 2.3 |

TABLE 5

Effect of precipitation and ultrafiltration/diafiltration process on commercial canola meal (NaOH extraction at pH 11, in the presence of 0.0024 M $Na_2SO_3$ equivalent to 1% w/w of the meal, 10 kD membrane for UF/DF).
Compositions And Yields

| | Protein | Glucosinolates | Phytic | Yield (as % of starting meal) | | | |
|---|---|---|---|---|---|---|---|
| | N × 6.25 | μM/g | acid % | Solids | N | Glucosinolates | Phytic acid |
| Starting meal | 44.7 | 9.7 | 4.14 | 100 | 100 | 100 | 100 |
| Meal residue | 41.6 | N/D | 5.72 | 66.6 | 61.9 | ≈0 | 92.0 |
| Isoelectric protein | 82.6 | N/D | 2.00 | 11.9 | 22.0 | ≈0 | 5.7 |
| Soluble protein | 86.2 | N/D | 1.71 | 5.7 | 11.0 | ≈0 | 2.3 |
| LOSS | | | | 15.8 | 5.1 | ≈100 | 0 |

What is claimed is:

1. A process for treating meal containing vegetable proteins comprising:
    (i) extracting said meal with an alkaline solvent for said vegetable proteins at a pH of from 10 to 12.5 to obtain an extraction solution containing a meal residue;
    (ii) removing said meal residue;
    (iii) adjusting the pH of said extraction solution by addition of an aqueous acid solution to a value of from 2 to 8 thereby precipitating at least some of said vegetable protein, to obtain an unprecipitated protein fraction in solution and a precipitated protein fraction;
    (iv) separating the precipitated protein fraction from the protein fraction in solution; and
    (v) separating the unprecipitated protein fraction from the undesirable components in the solution by membrane filtration;
    wherein said meal comprises one of defatted rapeseed and canola meal.

2. The process according to claim 1 wherein membrane processing comprises ultrafiltration.

3. The process according to claim 1 wherein said membrane processing comprises diafiltration.

4. The process according to claim 1 wherein said membrane processing comprises ultrafiltration followed by diafiltration.

5. The process according to claim 1 wherein said meal containing vegetable proteins is selected from the group comprising hexane-extracted in air-dried canola meal, methanol/ammonia/hexane-extracted canola meal, dehulled hexane-extracted and air-dried canola meal, dehulled methanol/ammonia/hexane-extracted canola meal and commercially prepared rapeseed meal.

6. The process according to claim 1 additionally comprising washing with a suitable acidic solution, and drying said precipitated protein fraction.

7. The process according to claim 1 wherein said unprecipitated protein fraction in solution is suitably dried and recovered after membrane processing.

8. The process according to claim 1 wherein said alkaline solution is selected from the group consisting of sodium hydroxide, potassium hydroxide and calcium hydroxide.

9. The process according to claim 1 wherein said aqueous acid solution is selected from the group consisting of hydrochloric acid, sulphuric acid, phosphoric acid and acetic acid.

10. The process according to claim 1 wherein the pH of said extracted solution is lowered to 3.5.

11. The process according to claim 4 wherein the nominal molecular weight cut-off of the membrane is between 5–50 kilodaltons.

12. The process according to claim 10 wherein said nominal molecular weight cut-off of the membrane is 10 kilodaltons.

13. The process according to claim 4 wherein said ultrafiltration has a concentration factor between 5-20.

14. The process according to claim 13 wherein said concentration factor is 10.

15. The process according to claim 4 where said diafiltration has a diavolume of between 3-15.

16. The process according to claim 15 wherein said diavolume is 5.

17. The process according to claim 6 wherein the ratio of the acidic washing solution to the precipitated protein fraction is between 5-20.

18. The process according to claim 17 wherein said ratio is 10.

19. The process according to claim 1 wherein the extraction solvent-to-meal ratio is between 8 and 50.

20. The process according to claim 19 wherein said ratio is 18.

21. The process according to claim 1 additionally comprising, during the adjustment in solubility of said extraction solution, the addition of calcium chloride.

22. The process according to claim 1 wherein during said extracting, a suitable antioxidant is added.

23. The process according to claim 22 wherein said antioxidant is sodium sulphite.

24. An acid-soluble vegetable protein isolate when prepared by a process according to claim 1.

25. A process for treating meal containing vegetable proteins comprising:
  (i) extracting said meal with an aqueous alkaline solution for said vegetable proteins at a pH of from 10 to 12.5 to obtain an extraction solution containing a meal residue;
  (ii) removing said meal residue;
  (iii) changing the pH of said extraction solution by addition of an aqueous acid solution to a value of from 2 to 8 thereby precipitating at least some of said vegetable protein to obtain a precipitated protein fraction and an unprecipitated protein fraction solution;
  (iv) separating said precipitated protein fraction from said unprecipitated protein fraction solution by acidic water washing and drying;
  (v) separating the unprecipitated protein fraction from the undesirable, low-molecular-weight components in the solution by ultrafiltration followed by diafiltration;
  (vi) recovering said unprecipitated protein fraction in solution by drying; and
  wherein said meal comprises one of defatted rapeseed and canola meal.

* * * * *